United States Patent
Bisht et al.

(10) Patent No.: US 11,601,455 B2
(45) Date of Patent: *Mar. 7, 2023

(54) ARTIFICIAL INTELLIGENCE METHOD AND SYSTEM FOR DETECTING ANOMALIES IN A COMPUTER NETWORK

(71) Applicant: AKITRA, INC., Sunnyvale, CA (US)

(72) Inventors: Naveen S. Bisht, Sunnyvale, CA (US); Kanna Rajan, Sunnyvale, CA (US)

(73) Assignee: AKITRA, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,639

(22) Filed: Jul. 29, 2020

(65) Prior Publication Data

US 2020/0358800 A1    Nov. 12, 2020

Related U.S. Application Data

(63) Continuation of application No. 16/006,707, filed on Jun. 12, 2018, now Pat. No. 10,771,489.

(51) Int. Cl.
  *H04L 29/06* (2006.01)
  *H04L 9/40* (2022.01)
  *G06N 7/00* (2023.01)
  *G06F 16/22* (2019.01)

(52) U.S. Cl.
  CPC .......... *H04L 63/1425* (2013.01); *G06F 16/22* (2019.01); *G06N 7/005* (2013.01)

(58) Field of Classification Search
  CPC ...... G06F 16/22; G06N 7/005; H04L 63/1425
  See application file for complete search history.

(56) References Cited

PUBLICATIONS

Scarfone et al., "Guide to Intrusion Detection and Prevention Systems (IDPS)," National Institute of Standards and Technology, Special Publication 800-94, 2007.

*Primary Examiner* — Brian F Shaw
(74) *Attorney, Agent, or Firm* — Richard T. Ogawa; Ogawa P.C.

(57) ABSTRACT

A system comprises an enterprise network system and engine. The engine has a discovery module coupled to a switch device, an AI and machine learning based monitoring and detection module coupled to the switch device, and a remediation module coupled to the switch device. The remediation module is configured to initiate a remediation process based upon the detection of at least one of the anomalies from the flow of data.

17 Claims, 10 Drawing Sheets

Akitra Ai3 Solution

Figure 2

Catalog
- ✓ Partial automation for data collection from different source
- ✓ Web Application for device data collection
- ✓ Minimal integration with Discovery for profiling the devices

| | Total | Completed |
|---|---|---|
| Total device count | 21016 | |
| Thermostat | 613 | 613 |
| Camera | 9138 | 9138 |
| Bulb | 3035 | 3033 |
| Medical device | 5009 | 4887 |
| Lock | 677 | 677 |
| Printer | 1722 | 1722 |
| Power Socket | 528 | 528 |
| Meter | 24 | 24 |
| HVAC system | 126 | 126 |
| Coffee maker | 44 | 44 |
| Refrigerator | 224 | 224 |

*Figure 8*

Product details : Edit

| Product Catalog | Home | Edit |

Goto page: [ ] Device type: [ ] Manufacturer name: [ ] Device model number: [ ] [Submit]

| Type of device | Manufacturer | Model type | Sub type | Model | Product name | URL | Image | Basic commands | Advanced commands | Events | Status |
|---|---|---|---|---|---|---|---|---|---|---|---|
| thermostat | Insteon | Programmable thermostat | | 2441ZTH | Insteon Thermostat Programmable Remote & Smartphone Controllable - Device 42 - 2732-292 | | 818dbc64-9460-5842-baba-a080ef28881.jpg | details | details | Partial | yes |
| thermostat | Honeywell | Enviracair | | CT3500A | Honeywell PROGRAMMABLE THERMOSTAT ( CT3500A1004 ) | | bdadf87c-873c-554a-db76-13968f05e5878.jpg | details | details | Partial | |
| thermostat | Lux | TX500E Series | | TX500E | Lux Smart Temp TX500 Programmable Thermostat | http://luxproducts.com/TX500E.html | | details | details | Partial | yes | ered with a plurality of specialized engines. The engine has
ARTIFICIAL INTELLIGENCE METHOD AND SYSTEM FOR DETECTING ANOMALIES IN A COMPUTER NETWORK

RELATED APPLICATION

This application is a continuation of and claims priority to U.S. patent application Ser. No. 16/006,707 filed Jun. 12, 2018, which is now allowed, the contents of which are incorporated herein by reference.

BACKGROUND OF THE INVENTION

The present invention relates to configuring and managing network Internet of Things (IoT) devices security policies. More specifically, the present invention relates to configuring, authenticating, and managing of network internet of things devices security at single administration points using a purpose-built security appliance in form of a software module as virtual machine, a software container or a hardware appliance or security software services provided as software as a service from public or private cloud-based data centers. Further the present invention relates to management of multi-platform, multi-types of Internet of Things devices security using services such as crypto protocols, security policies, Authentication Servers, etc.

With the explosive growth of the Internet of Things devices being connected to internet and networks including enterprise and home networks, huge streams of data as it is collected, parsed and analyzed to enable and bring much needed efficiencies and cost savings to these infrastructures. At the same time, the infrastructures of organizations, organizational networks, servers with confidential information are becoming even more vulnerable to further exposure to outside threats for being hacked, malicious software codes to be injected into these networks and servers via these internet of things devices and create new openings to access many valuable sources of information. Additionally, users are now exposed to many new perils. Such perils include downloading of destructive computer viruses to sophisticated third-party, network attacks. In response to dangers lurking from "outside" computer networks, new ways of addressing these problems have emerged and using various techniques from the field of machine learning and artificial intelligence are being applied in combination with security technologies to address these emerging attacks.

These and other limitations of conventional networks are described throughout the specification and more particularly below.

SUMMARY OF THE INVENTION

The present invention discloses methods and apparatus for configuring and managing network Internet of Things (IoT) devices security policies.

According to one embodiment, a method for configuring a plurality of network interne of things devices, includes the steps of providing a network directory services server called Authentication Type Services Sever providing directory services to a plurality of network IoT devices, each of the plurality of network IoT devices coupled to one of the plurality of network IoT security devices and IoT gateways and implementing a security policy enforcement for the plurality of network IoT security devices on the network IoT directory services server as part of the overall IoT Security Appliance engine. The step of using the network IoT Authentication/Type Service directory services to provide configuration information for the plurality of network IOT Security devices, in response to the security policy is also disclosed.

In an example, the system is an enterprise network system. The system has various elements such as a data source coupled to a network, a router coupled to the data source, a switch device coupled to the router, among other network elements. The network can include servers such as web servers, database servers, and other application servers, bridges, other routers and switches, connected to a data center or Cloud.

In an example, the present system has an engine configured with a plurality of specialized engines. The engine has an instant auto discovery engine (IAE) module coupled to switch device.

In an example, the discovery module is configured to monitor traffic to the switch device to detect all of a plurality of client devices, including a plurality of IoT devices. The IAE module is coupled to the switch device and configured to detect all of a plurality of sensor devices coupled to the switch device. The IAE module is configured to detect all of a plurality input device coupled to the switch device. The IAE module comprises a catalog of each of the plurality of client devices, input devices, sensing devices, or other network devices. Each of the devices also has profile information on a common database or memory resources.

Additionally, the engine has a behavior analytics engine (BAE) module coupled to the switch device. The BAE module is configured to monitor traffic to the switch device and configured to detect one or more anomalies from a flow of traffic. Of course, there can be other variations, modifications, and alternatives.

The engine has an intelligent machine learning engine (IMLE) module configured with the BAE module. In an example, the IMLE module is configured to process the flow of data through one of a plurality of processes. The one of the plurality of processes is numbered from one through N, where N is greater than 5 or other number greater than 1. In an example, the plurality of processes is categorized into a clustering process, a classification process, a regression process, an association process, a probabilistic processes comprise a Bayesian Network, or a graph based model, alone or in combination with any of the other aforementioned processes, among others.

In an example, the engine has a smart security engine (SSE) module. In an example, the SSE module is configured to implement a security measure from feedback from the BAE module.

The engine has an autonomous decision engine (ADE) module coupled to the SSE module.

In an example, the ADE module is configured for a remediation process. In an example, the remediation process comprises an autonomous decision engine comprising a sense process, plan process, and an act process (collectively the "AI processes" or "AI decision processes"), and is configured to make a decision from the flow of data to remediate and take appropriate action based upon the what signal is received from the client device, and processed through a behavior analytics engine thereby feeding information into the autonomous decision engine taking into account information selected form an a status of an internal state, a response associated with the internal state and a received input, and a model associated with the device from a catalog stored in a database for remediation to reason over achieving a future state using remediation to predict a future state and use the AI processes to ensure migration to the future state.

In an example, the engine works with the modules to collectively perform the operations described, among other operations. In an example, the IAE module, BAE module, ADE module, and SSE module are configured to discover instantly the plurality of client devices connected to the network, monitoring the flow of data from each of the plurality of the client devices, detecting at least one anomaly, and taking a remediation action for the detected anomaly.

According to another embodiment, a network of trusted network servers including a computer system for configuring security features in the network of trusted network servers is described, the computer system including a processor and a computer readable media. The computer readable media including software code that directs the processor to provide directory authentication services to the network of trusted network servers and software code that directs the processor to receive security feature configuration data for the network of trusted network servers from a remote client. The computer readable media also includes software code that directs the processor to use the Authentication Type Server directory services to provide each of the network of trusted network servers with the security feature configuration data and validate the authenticity of the IoT devices.

Further understanding of the nature and advantages of the invention may be realized by reference to the remaining portions of the specification, drawings, and attached documents

BRIEF DESCRIPTION OF THE DRAWINGS

FIG. 2 illustrates a more detailed embodiment of a catalog table according to an example of the present invention;

FIG. 8 is a catalog table according to an example of the present invention.

DESCRIPTION OF SPECIFIC EMBODIMENTS

Figure 1:
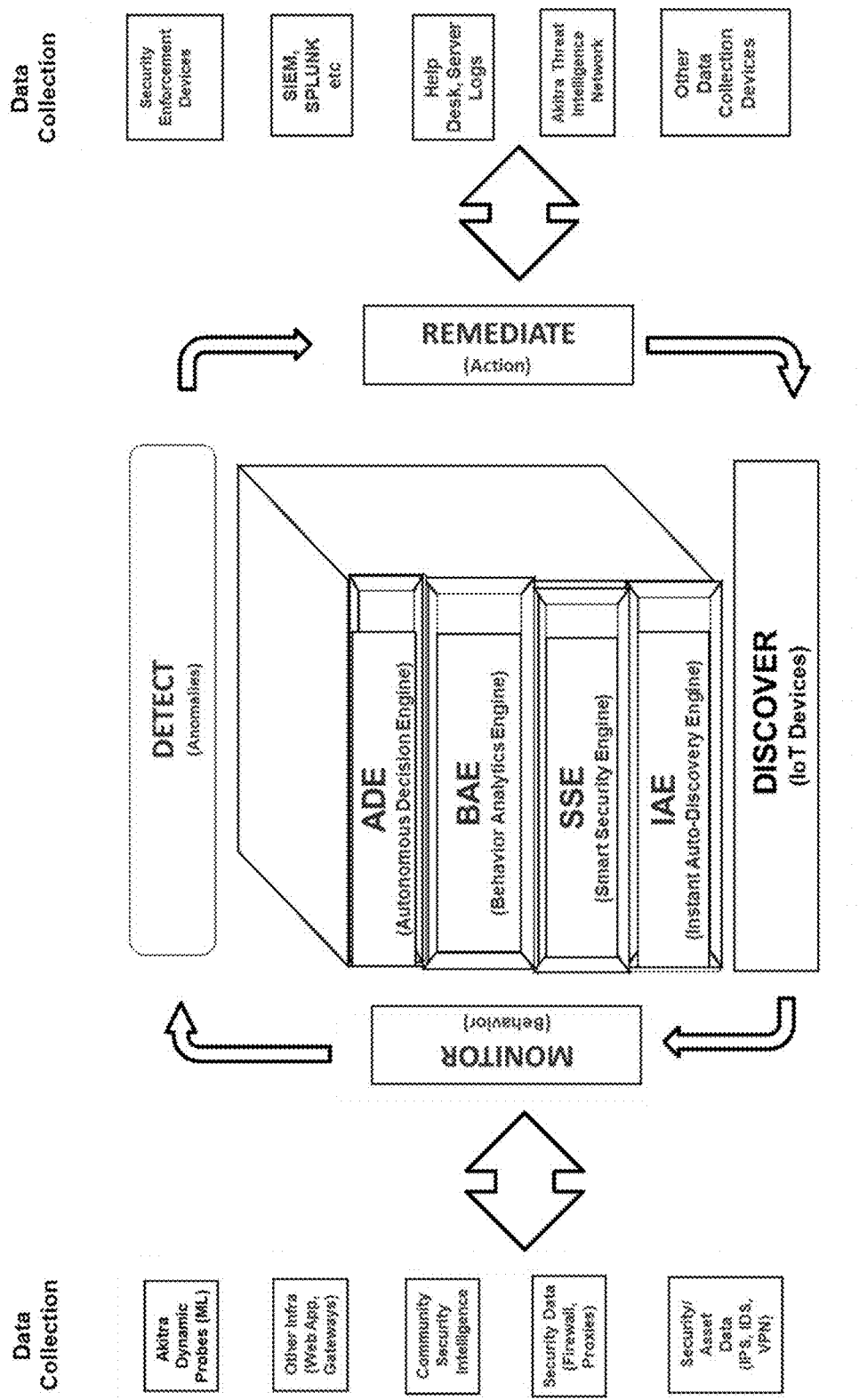
FIG. 1 illustrates a simplified diagram of an artificial intelligence system according to an example of the present invention.

The present invention discloses methods and apparatus for configuring and managing network Internet of Things (IoT) devices security policies.

In addition to what has been described, the increased dependence of government, military, commercial, profit and non-profit organizations on Internet technologies to conduct their everyday business essentially create new challenges for cyber defense. The advancing complexity and variety of cyber-attacks have almost rendered traditional IT defense methods such as anti-virus software, firewalls or intrusion prevention systems ineffective in preventing these attacks. As corporations and other organizations connect more of their networks to these IoT devices and public Internet, the risks of endangering information assets have risen even more dramatically. Connected devices will change the way we work, live and play in the near future—per Gartner Group, 25 Billion connected devices will create about $1.7 Trillion in market opportunity in coming years. Despite this massive opportunity for organizations to be using IoT within 3 years, IoT is our single biggest security threat and biggest opportunity over the next 10 years. The rise of cyber-attack prevention across all industries and the mindset in how they approach security needs to be looked at in a whole new way. According to M-Trends, it took an average of 205 days for a company to detect a breach and though 2014 was the Year of the mega-breach, 2015 was worse, with nearly 4,000 breaches and over 750 million records stolen.

Not a day or a week passes without the mainstream media commenting on the latest episode of Internet of Things related attacks, fraud, information corruption, or other incidents that dramatically underscore the darker side of the internet and communications revolution. Computer and communications security, a topic once the exclusive province of obscure firms catering mainly to the government defense, intelligence agencies, public services networks and to financial services companies, have become mainstream for over last two decades and more and more sophisticated attacks into these networks are being perpetrated and hence, there is an immediate need to provide dynamic and innovatively adaptive security solutions based on machine learning, artificial intelligence and robotics processes that continue to become smarter and smarter as more data is fed into these systems so they can autonomously take remediation actions.

Innovative solutions and new approaches are needed for detecting and investigating malicious activity, as a single breach can cause financial losses to a tune of about $5.9 million and a major hit to institutional branding and reputation. In addition to the constantly changing IoT landscape, challenging unique dimensions of IoT security consists of limited system resources (lack of standard OS and system resources), large variety of devices (Current End Point Security Systems not designed for IoT), complex deployment topologies, and repeatable network patterns (designed for similar tasks). Monitoring Single Presence, Single Method, Single Event and Single Signal is NO longer viable for IoT infrastructure and hence, there is a need for next Generation AI-based Autonomous and multi-dimensional Threat Intelligence Solutions for IoT Cyber Security that can monitor, detect, and take action at every point similar to a Cyber kill Chain in near real time. Cyber hunting is a time consuming and intensely manual process as of today. However, with rapid advances in machine learning and autonomous systems, these technologies can help detect in near real time and hence, a huge business opportunity for using this adaptive AI-based Threat Control Technology.

The concern for network security has led to a need for more sophisticated security systems than most organizations have needed until now. Most of the security systems today are focused on information technology assets such as computers, laptops, smart phones, tablets or pads and are not focused on providing security for IoT devices which are inherently different in characteristics such as low compute and storage resources, low footprint, different types and no single operating system unlike personal computers, laptops etc. At one time, these organizations were content with the security provided by their network operating systems, network directory services, routers, firewalls, intrusion prevention and detection systems and gateways. However, these systems are now no longer sufficient to resist the attacks of legions of determined Internet hackers from variety of attack surfaces and proliferation of different devices including mobile, smart phones, internet of things devices or from insiders such as organization's own employees.

In general, a firewall is deployed as a security mechanism for controlling access between a private, trusted network and an untrusted outside network such as public Internet or public cloud or datacenter or some other part of the corporate network like a private cloud. Today, next generation Firewalls typically provide from one to three levels of security consisting of packet filtering, circuit-level gateway functionalities, and application-level firewalling capabilities including deep packet inspections. Firewalls are also of many types today from web application firewalls, application level firewalls, network security firewalls and they often differ greatly in their architecture, the types platforms they run upon, their security capabilities, and their ability to support variety of protocol networks. These firewalls do not support IoT devices and many legacy protocols such as Zigbee, ZWave, LowPan, Bluetooth, modbus, BACnet and others that number of these IoT devices are used for.

Variety of Protocols for Internet of Things Devices and Networks

The choices of connectivity options for developers working on products and systems for the Internet of Things (IoT) varies from well-known communication technologies such as WiFi, Bluetooth, ZWave, LoPan, SigFox, ZigBee and 2G/3G/4G cellular, but there are also several new emerging networking protocols supported by vendors such as Google, Apple, Alljoyn Consortium such as Thread as an alternative for home automation applications and Whitespace TV technologies being implemented in major cities for wider area IoT-based use cases. Depending on the application, factors such as range, data requirements, security and power demands and battery life will dictate the choice of one or some form of combination of technologies. Thus, mixed protocols, networks at both the protocol and operating system platform level will be around for years to come as well as the need to securely and seamlessly access the Internet and its rich information resources using Internet of Things devices and gateways.

Current solutions for providing security for these environments are in nascent stages and quite limited in scope. For example, WiFi access points and IP gateways provide Internet connectivity for IP-enabled devices such as laptops, smartphones, computers, tablets, pads and IP-enabled IoT devices, but the security is very basic and not available for devices supporting other protocols as above. Further, the security focus of these gateway products is typically on access control and not on behavior analysis of these IP-enabled devices and not on dealing with the more serious problem of behavior fluctuations, detecting anomalies and then doing analytics to do processing, reasoning and predicting threat and providing threat intelligence in a comprehensive manner. More importantly, these gateways do not appear to provide security for IoT devices. A solution that discovers, identifies and classifies assets into IoT categories rather than treating them as IT assets by generating a baseline of normal device behavior and identifies its risk profile and as it detects the anomalous device behavior and correlates it against the normal device behavior, it can close the control loop by providing real-time policy enforcement.

The usefulness of current security systems and solutions have been limited, by their inability to work in network environments that employ devices with different protocols and different platforms. What is needed are improved security configuration and management methods and apparatus for such emerging new network environments consisting of not only information technology assets but also internet of things device assets. Further details of the present invention can be found throughout the present specification and more particularly below.

This following section defines some security terms and explains some key concepts to understanding the different architectural approaches to building Network Security Anomaly Detection, Intrusion Detection Software or Hardware Appliances and similar security concepts are used for IoT devices in a new way. In enterprises or organizations nowadays, network security Intrusion detection systems (IDS) are a significant component to help protect against increasingly sophisticated cyber—attacks being carried out by unscrupulous actors. These systems that rely solely on a database of prior known attacks or signatures are no longer effective in detecting modern day threats. Our approach is to use state-of-the-art machine learning and Artificial Intelligence techniques in novel ways to discover, monitor, detect and remediate on these unknown threats or attacks by identifying attack features from the devices these attacks get carried out. The data mining techniques have been employed with our solution and in particular, the data pre-processing stage, which includes feature selection consists of selecting relevant subsets from the original dataset in order to minimize the effect of irrelevant and redundant features without greatly decreasing the accuracy of the classifier. The files and other information, the devices use need to be protected with an automated tool.

The increased dependence of government, military and commercial organizations on Internet technologies to conduct their everyday business creates new challenges for cyber defense. The advancing complexity and variety of cyber-attacks have almost rendered traditional IT defenses, such as anti-virus software or intrusion prevention systems. A deliberate action against data, software or hardware that can destroy, degrade, disrupt or deny access to a networked computer system is called a cyber-attack. Now a day, in the area of intrusion detection, data mining techniques have been employed with success. In particular, the data pre-processing stage, which includes feature selection, has attracted much attention. Feature selection selects relevant subsets from the original dataset in order to minimize the effect of irrelevant and redundant features without greatly decreasing the accuracy of the classifier. In protecting files and other information computer use implies a need for automated tools. In cryptography basically we have to know about some terminology like plain text, cipher text, encryption, decryption and keys. Plain text: The data which are having valid meaning is called plain text. Cipher text: The data which does not having valid meaning is called cipher text. Encryption: Converting plain text into cipher text is known as encryption. Decryption: Decryption is the reverse process of encryption. This means converting cipher text into plain text. Keys: keys are two types:1. Public key and 2. Private Key—Public key is known to every node in the network. And private key is known to only the generated node.

Definitions

Cyber-Attack—Per Wikipedia, a cyberattack is any type of offensive maneuver employed by nation-states, individuals, groups, society or organizations that targets computer information systems, infrastructures, computer networks, and/or personal computer devices by various means of malicious acts usually originating from an anonymous source that either steals, alters, or destroys a specified target by hacking into a susceptible system.

Intrusion Detection System: An intrusion detection system (IDS) dynamically monitors logs and network traffic, applying detection processes for past known attacks also called signatures to identify these potential intrusions with in a network. In general, Intrusion detection systems are of two types. The first one is host-based and is considered the passive component. The second one is network-based and is considered the active component. Network based IDSs are easier to deploy for each network segment and monitor network traffic traveling to all the systems. A network-based IDS sensor will listen for all the attacks on a network segment regardless of the type of the operating system the target host is running Host based systems, on the other hand, can detect attacks that network-based IDS sensors fail to detect. Host based sensors can be useful in protecting hosts from malicious internal users or inside attacks in addition to protecting systems from external attacks. IDS systems are further divided into two categories based on the detection methods they employ. For example, Misuse detection is the most common approach and uses knowledge database of known attack patterns to scan for signatures, monitor state transitions or employ correlation and data mining techniques to identify potential attacks. They can be effective for detecting a limited set of known cyber-attacks with low false alarm rates against the information stored within the database and are ineffective for detecting new classifications or unknown attacks. Therefore, Anomaly Detection methods are employed to overcome this problem by assuming that cyber-attacks are 'abnormal' and identifiable by noting their deviation from the 'normal' behavior model or profile of the devices.

Firewall: A type of security mechanism for controlling access between a private trusted network and an untrusted outside network like public interne or private cloud. It typically includes software running on general purpose or specialized hardware or running on a public cloud and protecting the services of an enterprise with cloud firewall services.

Protocol gateway: A protocol translation mechanism for connecting (for example) different protocols to an IP network, for example a public network to private network. The term 'gateway' is also sometimes used to refer to circuit-level and application-level firewalls but these are not protocol gateways.

Device Catalog Services Server: This is a form of Directory Services that are global, distributed information databases that stores information about all IoT devices with the manufacturer, model, specification details, access to network resources, devices information, device characteristics regardless of physical location and provides syncing with the Behavior Analytics Engine. This also can be linked to prevalent enterprise directory services that are used for users and assets. These are preferably Lightweight Directory Access Protocol, a directory protocol standard, commonly used Microsoft's Active Directory Services and other directory services provide central points of administration for entire networks of networks. These directory services typically maintain information about every resource on the network, including users, groups, printers, volumes, and other devices. This information is typically stored on a single logical database, thus, instead of logging onto many individual file servers, users and network administrators log onto the network preferably only once.

Network address translation (NAT): With the growing shortage of IP addresses, it has become increasingly difficult for organizations to obtain all the registered IP addresses they need. A network address translator solves this problem by dynamically converting between a re-usable pool of dynamically assigned registered IP addresses and the internal IP addresses used in an organization's intranet. This not only alleviates the IP address crunch, but it also eliminates the need to renumber when an organization changes Internet service providers (ISPs).

Transparent proxy: A transparent proxy provides the user with the ability to use an application process running on a firewall without explicitly requiring the client to specify that proxy. In other words, the client perceives that it is still speaking to the router gateway. This feature typically makes it considerably easier to install a firewall without having to reconfigure every client in a TCP/IP environment.

The major types of networks in terms of their security classification are as follows:

Trusted network: Users on this network are, by default, deemed to be trustworthy. Users may be physically on a common network, or linked together via a virtual private network (VPN).

DMZ: The 'Demilitarized Zone' lies outside the perimeter defenses provided by the firewall but contains systems that are owned by a private organization. Common examples would be Web servers and anonymous ftp servers providing information to Internet users.

Untrusted network: These are outside networks of various kinds, among the many thousands of networks connected to the Internet, or even untrusted networks that may be part of other departments or divisions within an organization.

Types of Firewalls Used for Information Technology Assets

Firewalls typically provide one of three different levels of security—packet filtering, circuit-level gateway, and application gateway—or some combination of these.

Packet filtering firewalls typically provide the most basic form of firewall security and are typically a standard feature of routers, operating systems. Packet filters inspect the header of each incoming and outgoing packet for user-defined content, such as an IP address or a specific bit pattern, but do not validate or track the state of sessions. These firewalls typically also filter at the application port level—for example, ftp access generally utilizes port 21. However, since any packet with the right IP address can pass through the filter once the port is enabled, there is a security hole for other applications or sessions addressed to the same port. Packet filtering is typically the least secure form of firewall and typically the cheapest.

Circuit-level gateway firewalls validate TCP and, in some products, User Datagram Protocol (UDP) sessions before opening a connection or circuit through the firewall. The state of the session is monitored, and traffic is only allowed while the session is still open. This is more secure than packet filtering but allows any kind of data through the firewall while the session is open, creating a security hole. This is better than packet filtering but still falls short of total security. Further, if this gateway does not support UDP, it cannot support native UDP traffic such as domain name service (DNS) and SNMP.

Application-level gateway firewalls run an application process (sometimes termed a 'proxy') on the firewall for each application that is supported. By understanding the application and the content of the traffic flowing through the firewall, typically a high degree of control can be applied. These firewalls typically also provide highly detailed logging of traffic and security events. In addition, application-level gateway firewalls can use NAT to mask the real IP address on a node on the internal network and thus make it invisible to the outside.

Stateful inspection firewalls are essentially hybrid firewalls that have elements of all of the above firewalls but lack the full application layer inspection capabilities of an application level gateway. An example of such a firewall is a traffic inspection engine is based on a generalized scripting language. The engine executes inspection rules written in this language. The principal advantage over an application gateway is that it can provide greater simplicity in terms of adding firewall support for new applications, however it typically lacks security robustness.

Typically, the most secure form of firewall, as illustrated by the preferred embodiment of the present invention, is a 'multi-level firewall'—one which combines the capabilities of a packet filter, a circuit level gateway and an application level gateway to provide in-depth defense. Security attacks can come at any level. For example, some kinds of attacks are best prevented at the application level (such as an illegal file write operation to a corporate server using FTP) while others are best prevented at the packet level (such as IP spoofing)—the combination of multiple levels of security is stronger than any one of them used alone.

In an example, to provide enhanced security and support for multi-protocol networks and internet of things devices, for example, with IP-enabled devices such as light bulbs, IP-Cameras, thermostats, refrigerators, door locks and any other devices connecting to Internet and supporting different protocols such as Bluetooth, ZigBee, Zwave, Thread, etc., the present application describes a new category of Internet of Things Cyber Security System—one that integrates both a multi-level security functionalities, machine learning based dynamic probes to collect and gather behavioral information pertinent to the IoT devices, behavior analytics engine and autonomous decision engine using artificial intelligence and robotics processes and technologies.

Security Policy-Firewalls and other types of security devices provide means of enforcing security policies that define acceptable uses of applications and acceptable access to information—both inbound and outbound. Since all network communications between a trusted network and all other types of network must pass through the firewall in a well-designed network, the firewall is uniquely well positioned to play the role of network traffic monitoring and policy enforcement station. The need for a new type of security appliance in IoT enabled networks is important as it needs to address variety of new devices, protocols, underlying operating systems and behaviors.

The access policy on the inbound side might define acceptable access to gateways or specific servers or other host by time of day, by type of device and its usage, or by type of application, and the like. On the outbound side, the policy might also prevent these IoT enabled devices from accessing specific Web sites, specific pages within a Web site, and the like and specific or any specific servers. A source of a communication, a destination, behavior patterns and a specific application are typically included in a security policy. Inbound or outbound communications that fall outside of the parameters of the policy are considered security violations or outside the behavior characteristics, and a Artificial Intelligence-based IoT Security Appliance can and should be configured to detect and prevent them.

However, sophisticated the hard ware and software that provides enterprise security, security is typically only as good as the organization's security policy for these devices and other applications and the users who implement it— including end users and network administrators alike. Since these devices and users are the weak link in any security system, ease of use and ease of management are essential to providing a security system that will not be abandoned because it is too hard to use or too expensive to manage. Further details of the present system and related methods are found throughout the specification and more particularly below.

FIG. 1 illustrates a simplified diagram of an artificial intelligence system according to an example of the present invention. As shown, the system has an autonomous decision engine ("ADE"). The ADE has been described herein, and further below. The system has a behavior analytics engine ("BAE"), which is also explained further below. Similarly, the system has smart security engine ("SSE") and instant auto discovery engine ("IAE"). Each of the engines configured together, as shown. In an example, the method includes a step of discover, monitor, detect, and remediate, which is repeated as shown. The engines are coupled to a plurality of data collection processes from existing networking devices, infrastructure, and other entities. As shown, the present technique includes a method for artificial intelligence and machine learning driven data analytics and threat protection for networks according to an example. The method includes the following functions:

Autonomous, Multi-Dimensional (A Software Appliance for Internet of Things (IoT) Threat Protection);

Discover Devices (IoT etc.) instantly;

Monitor Devices: Deviation from "device-specific behavior" and any others using new invention BAE (Behavior Analytics Engine) and new invention IMLE (Intelligent Machine Learning Engine)

Detect Anomalies (security and network);

Remediate via Surgical Specific Actions;

In an example, the system has an Autonomous Decision Engine (ADE), which is an important part of the technical infrastructure for automated response for its artificial and machine learning based engine for automated persistent threat diagnosis and response, as shown. The objective of the ADE is to use incoming sensory stream and then using its perception of the environmental context, decide in an 'autonomous' fashion and appropriate and actionable response to a situation it encounters. In doing so, it will evaluate multiple sources of data, which provide the 'context' and then use Artificial Intelligence search methods to decide what is an optimal response. The foundational basis for such a decision-making capability comes with a rich operational legacy in space and marine robotics and is therefore a mature technology for its slated goals. The key concept that the ADE deals with is to sense the network environment, based on a deterministic model, plan for dispatching commands and then to actually dispatch (or act) based on the formulated plan. The sense-plan-act paradigm then is at the core of this technology and provides the decision-making infrastructure inside the system. Further details of the ADE are shown below.

Architectural Features—Key architectural properties of the ADE are as follows:

a. it holds a temporal database of multiple co-temporal timelines—each timeline describes the state of a device (over time) and therefore tracks the device state changes.

Timelines progress continuously and therefore preserve the state of each device, and consequently the state of the entire system.

b. state changes within timelines are marked by 'tokens', atomic entities which describe a specific instantiated state of (in this case) a device. Tokens are connected to each other, within and between timelines, via constraints—the entire connected set of timelines, tokens, constraints forms part of a temporal database.

c. data to ensure the current state of each device needs to be fed to the ADE as a result in the form of 'events'. When a state transition occurs, a message needs to be sent to the ADE with the specifics of the device and the change of state.

d. typically, such data needs to be aggregated elsewhere outside the ADE and messaged to an DE interface.

e. equally, the Behavioral Analytics Engine (BAE), which is built on top of Machine Learning (ML) elements, need to be at the center of such event flagging. When an event of importance as decided by BAE is flagged, that event is messaged to the ADE—doing so will trigger change in state and therefore a new token on the appropriate timeline associated with a specific device.

f. the domain model is a key element of the ADE and the temporal database is an instantiation of such a model. Dependencies between elements in the model need to reflect the reality of dependence between devices. So, if a thermostat is being modeled, its location is a function of where the thermostat is measuring temperature needs to be made available. The model therefore needs to be carefully built based on the elements of the catalog. And the catalog in turn, needs to be a collection of objects which are linked in the model.

g. Actuation is based on a decision that the ADE makes. In this context, there can be two likely responses—one dealing with a security implication, namely being responsive to a determination of a cyber-attack, to which the ADE dispatches a message to the Smart Security Engine (SSE), which in turn will be expected to respond by shutting down a device, port or connection (or all the above). Or actuation based on making a deterministic choice to make a change in state of a device, not necessarily for security related decisions. An example could be, to change ambient lighting conditions in a room, over the course of an evening, while ensuring the room is being occupied.

Figure 4:
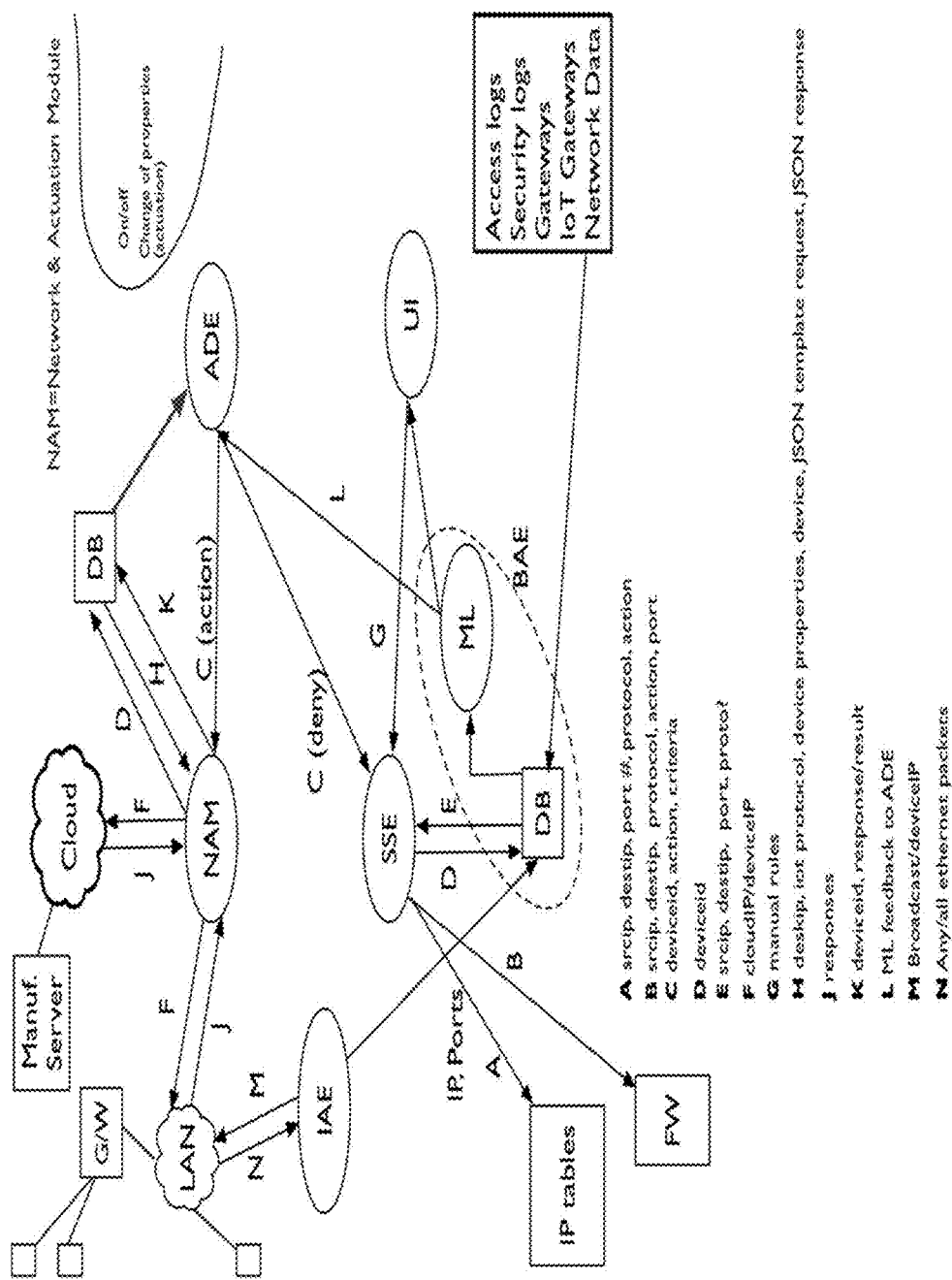
FIG. 4 is a simplified diagram illustrating a plurality of processes for anomaly detection according to an example of the present invention.

FIG. 4 illustrates the above key elements—most importantly the connectivity between the ADE, BAE and the SSE (Smart Security Engine). Equally, it shows the dichotomy between 'action(s)' across both nominal or off-nominal (i.e. anomalous) behavior detected by the ADE and driven by its model. Missing, is preventive action(s) that a system such as the ADE can take, (e.g. slowing down the speed of a water pump if it is determined that the pumps washers are wearing down)—but this is a design feature to be tackled at a later date.

What should be clear is that the ADE is a universal system which can be used to collate, inform and then actuate—akin to the central notion of whole system to Monitor, Detect and Remediate. Discovery is separate to such behavior (and currently part of the Instant Auto Discovery Engine (IAE)), but can, in the future, be included as part of the ADE or as a separate software engine module in itself.

Figure 1A:
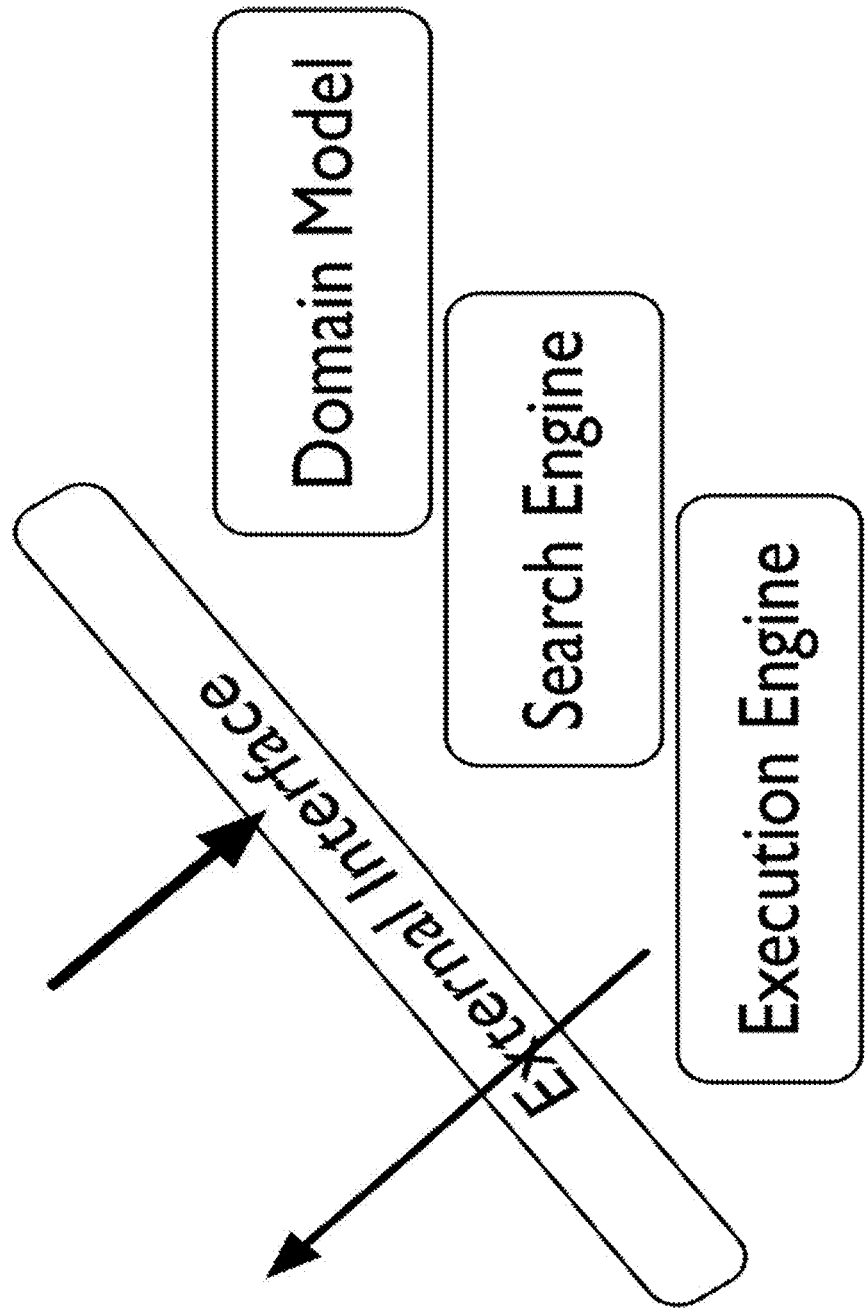
FIG. 1A illustrates a flow of an external interface coupled to a search engine, a domain model, and execution engine according to an example of the present invention.

The Model—It helps to visualize the ADE as in FIG. 1A, as being composed of a search and execution engines internally to its operation and attached to a domain model which forms the basis for its "knowledge" of the world it knows about, i.e the devices, their operation and their characteristics. This model tells the engine what the state of a device is, what it is connected to and how and when it (ADE) needs to perform an action. Typically, this information is given to the ADE via the device catalog and its associated database which it instantiates into a temporal database (i.e. keeps track of time)—as time progresses, the ADE "forgets" about its past to preserve its memory footprint.

The catalog needs to structured in a way that such information as needed, can be generated by discovery, but also relates the elements of this catalog to one another in a generic manner, so that when instantiated, there is actionable information within the ADE. The thermostat above is a simple example—its location, and not just its function is important to contextualizing where and how it works. So, when instantiated, the thermostat needs to work in the context of recording and changing the temperature of the room it is placed in. And in doing so, therefore, the actionable aspect that the ADE can then leverage is made clear by this causal link to the room.

The core of the ADE technology lies with the notion of dealing with constraints across various variables, as, also structured representation in dealing with evolving 'facts' that the engine needs to reason over. Time is explicitly represented and is therefore critical to reason with. The objects associated with these constraints come from the model. And the causal structure(s) determine the constraints. So, in the above running example, not only must the catalog link the thermostat to its location, but that in turn needs to be constrain the values that the ADE should be able to set or maintain—a thermostat in a fridge will therefore operate differently from a thermostat in a meeting room.

What this implies is that in the process of reasoning, the model is a key entity. A base level catalog will be adequate but not sufficient to ensure that the ADE can operate. Conversely, the catalog will also be the source of information on how the device is to operate—for the thermostat in a fridge temperature between −10° C. to +12° C., for example, will make sense, but not for a meeting room. So the model (and hence the catalog) will be the fount of all knowledge. And therefore, it is critical that it is maintained and secured appropriately.

Figure 1B:
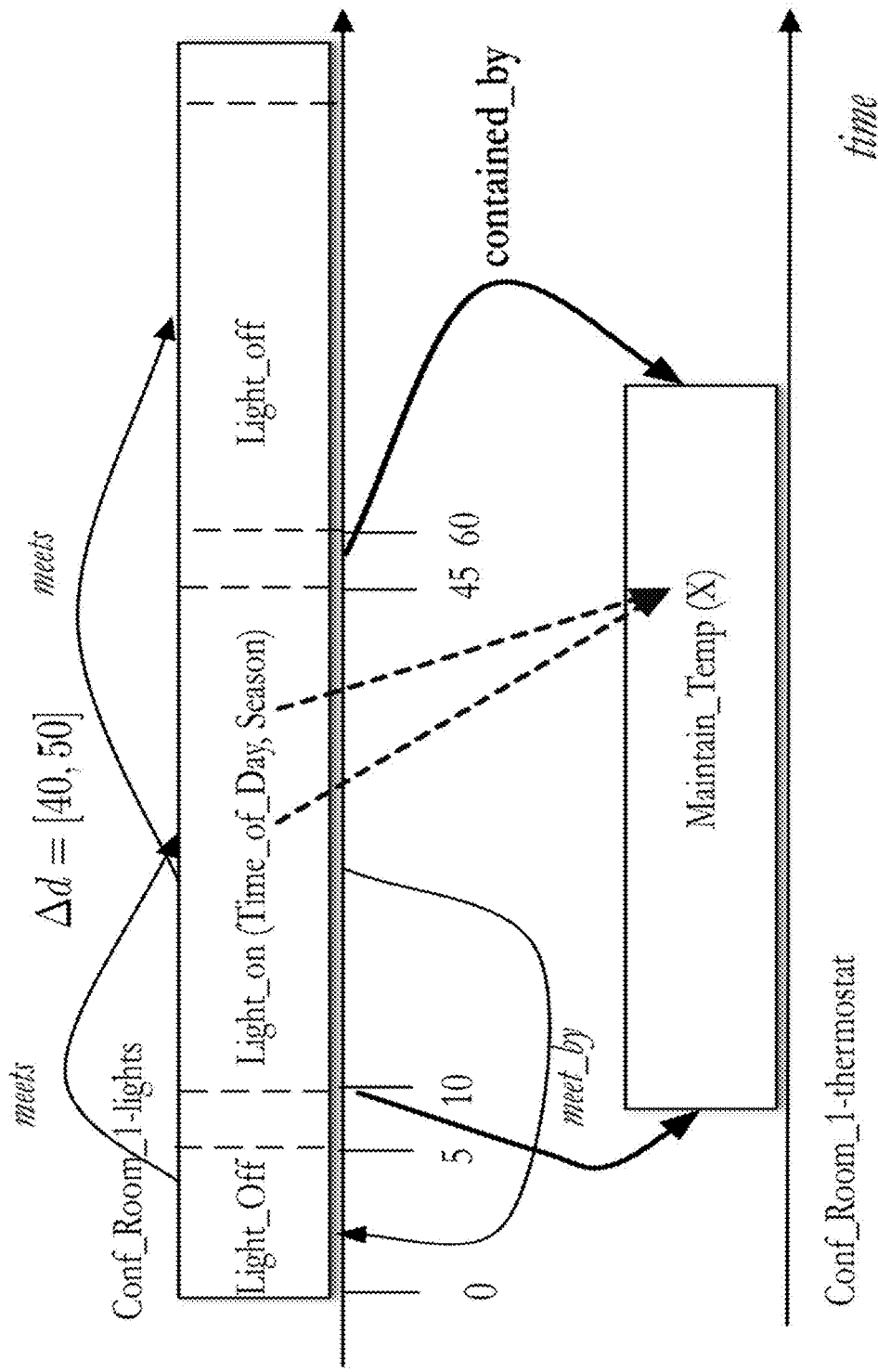
FIG. 1B illustrates a model of a thermostat according to an example of the present invention.

The Search Engine—Timelines, tokens and constraints are the atomic entities which define how the inside of the ADE is structured, as noted above. FIG. 1B shows the basic concepts with two simple timelines, one for lights and the other for a thermostat in a conference room. Time is shown varying from left to right and each colored box is a token, which describes the state of that artifact which is being modeled (i.e. a light and a thermostat in this example). The arrows represent the constraints; causal constraints are solid lines, while parametric are dotted. Causal constraints represent the transition between tokens based on what is represented in the catalog for the artifact in question and are therefore showing a simple finite state machine (FSM). Parametric are based on one or more equations which tie one or more variables together; so, the time of day (determined by the clock time) and the season (summer/winter etc.) determine what ambient condition the thermostat needs to maintain. Both of these 'constraints' need to be available to the ADE ultimately via the catalog. The two timelines for the lights and thermostat are related because of the causal links between where the thermostat is located. Other artifacts in this conference room will of course also need to be connected; for example, one can imagine a voice activated device such as Alexa could be in such a meeting room and therefore, will be readied when human activity (via sensors) is detected. The numbers are indicative of some time step— so example the FIGURE, the gap between 5 and 10 can be a time when there is a recognized slack when the conference room lights come to full lumen strength to be considered to be "on" from their "off" state.

The instantiation of the tokens above is done automatically by the ADE and is at the core of a 'plan'. So, what the FIGURE shows is how a possible future state of a conference room will look like. Execution then will be contingent on when such a plan can be activated with the arrival of one or more human occupants in the conference room. In addition, the notion of search here is then between what the system can/should do. So, for instance, if a light sensor (not shown above) shows that the window blinds are admitting enough Lumens that there is no need for turning "on" the lights, then the ADE will not do so. So, the plan above, is contingent to there not being enough Lumens in the ambient environment for it to turn the lights "on".

So, the objective of the 'search' engine here is to go over all possibilities for placing the tokens on the timelines as an expectation of a plan of action to act on, sometime in the future. Actual conditions dictated by other sensors (e.g. presence sensors for humans, ambient light) will actually dictate what plan is executed.

Execution—In the ADE, projecting via timelines (or 'planning') and acting (or 'executing') are closely tied together. While FIG. 1B shows a separation between the 'search' and 'execution' engines, in practice, they are closely intertwined. As a result, the outgoing lighter arrow in that figure is a way to represent an output of the ADE, whether that is directed at the NAM or the SSE. Execution simply means, that a message is sent out of the ADE which will impact one or both of these modules and represents a methodical way to show that actuation can/should/must occur based on the constraints and plans instantiated within its temporal database.

FIG. 2 illustrates an example of what a device catalog in the context of this system, contains. A catalog is a machine-readable table that describes detailed characteristics of a device, such as its hardware address, current IP address designation, manufacturer, operating system details. The focus of such a catalog is to provide as much information both to a security analyst, as well as provide actionable intelligence for the ADE engine. In an example, the catalog is organized in a manner such that it can be augmented by new devices on the market automatically, where possible, and therefore be current for the use at a customer's site updated via secure internet connection. The catalog then is used as a basis to understand the operating characteristics of an instance of an object in its database.

In the present example, the total devices available from a directory can be 13,557, but there can be additional or few devices. Each of the devices represents a type of device, such as a bulb, thermostat, camera, medical device, a lock, or any other entity coupled to the Internet or any Internet enabled device, which often has IP address or a unique identifier for meshed networks, or Bluetooth, or others, including any combinations thereof, and the like. Of course, there an be other variations, modifications, and alternatives.

Figure 3:
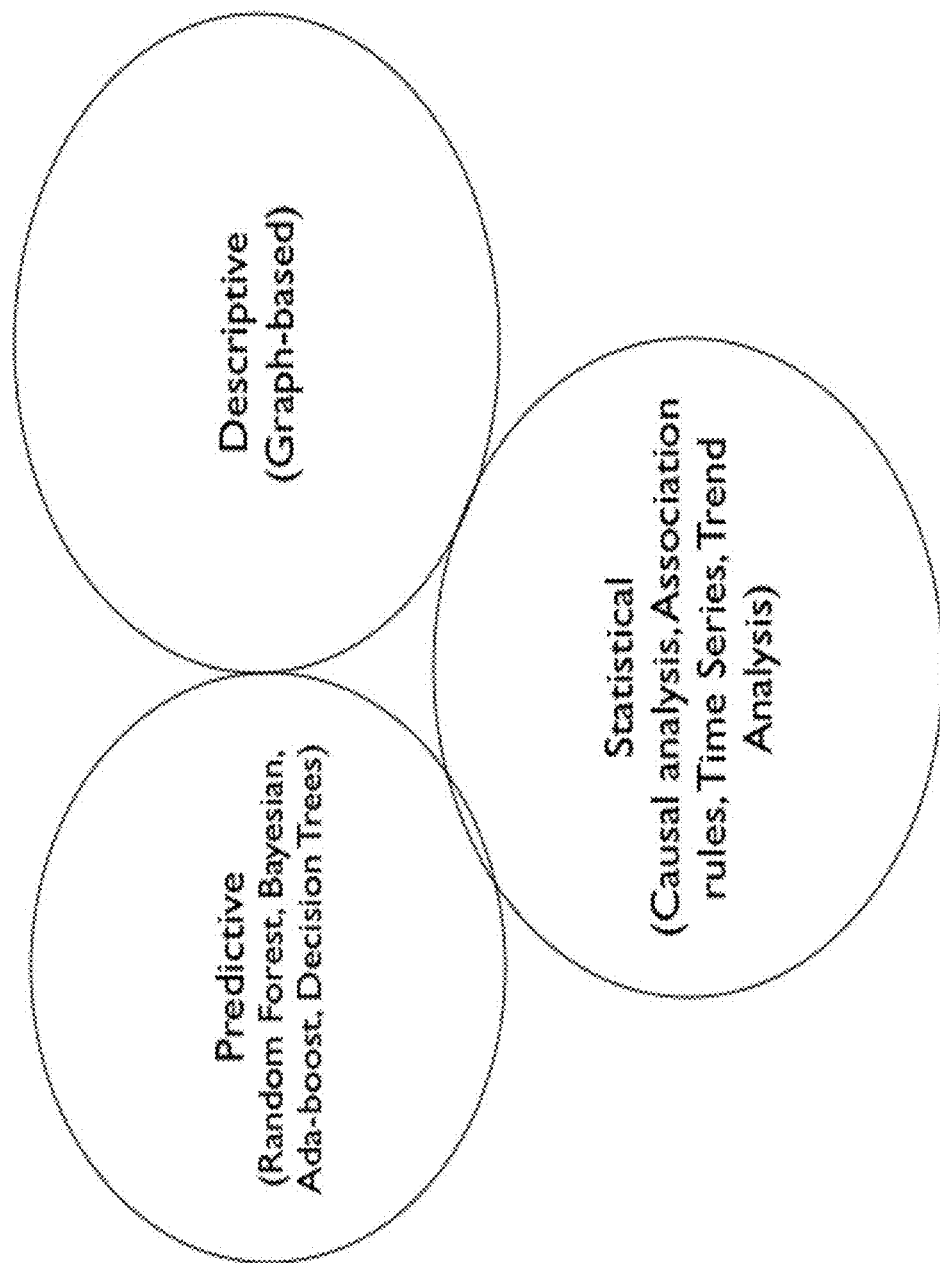
FIG. 3 is a simplified diagram of a venn diagram illustrating a plurality of processes for anomaly detection according to an example of the present invention.

FIG. 3 shows the amalgamation and plurality of techniques used by current invention is applicable across a vast range of network traffic flows. These techniques ensure that a variety of traffic patterns, sources, protocols and methods are categorized appropriately to ensure behavioral patterns (even when dynamic) are captured in the traffic flow. Predictive and Descriptive methods require model building; Statistical methods such as Trend Analysis and Time Series analysis are model-free and describe the attributes associated with a time varying traffic and determine anomalous conditions in real-time. Each of these processes are configured in a module, such as an intelligent machine learning engine, among others.

FIG. 4 is a simplified Venn diagram illustrating a plurality of processes for anomaly detection using various probabilistic and statistical techniques and methods such as clustering process, a classification process, a regression process, an association process, probabilistic processes such as Bayesian Networks, or graph-based models to determine the associations or combination of number of these processes working together to monitor the behavior of these internet of things devices connected to the network or internet according to an example of the present invention.

Figure 5:
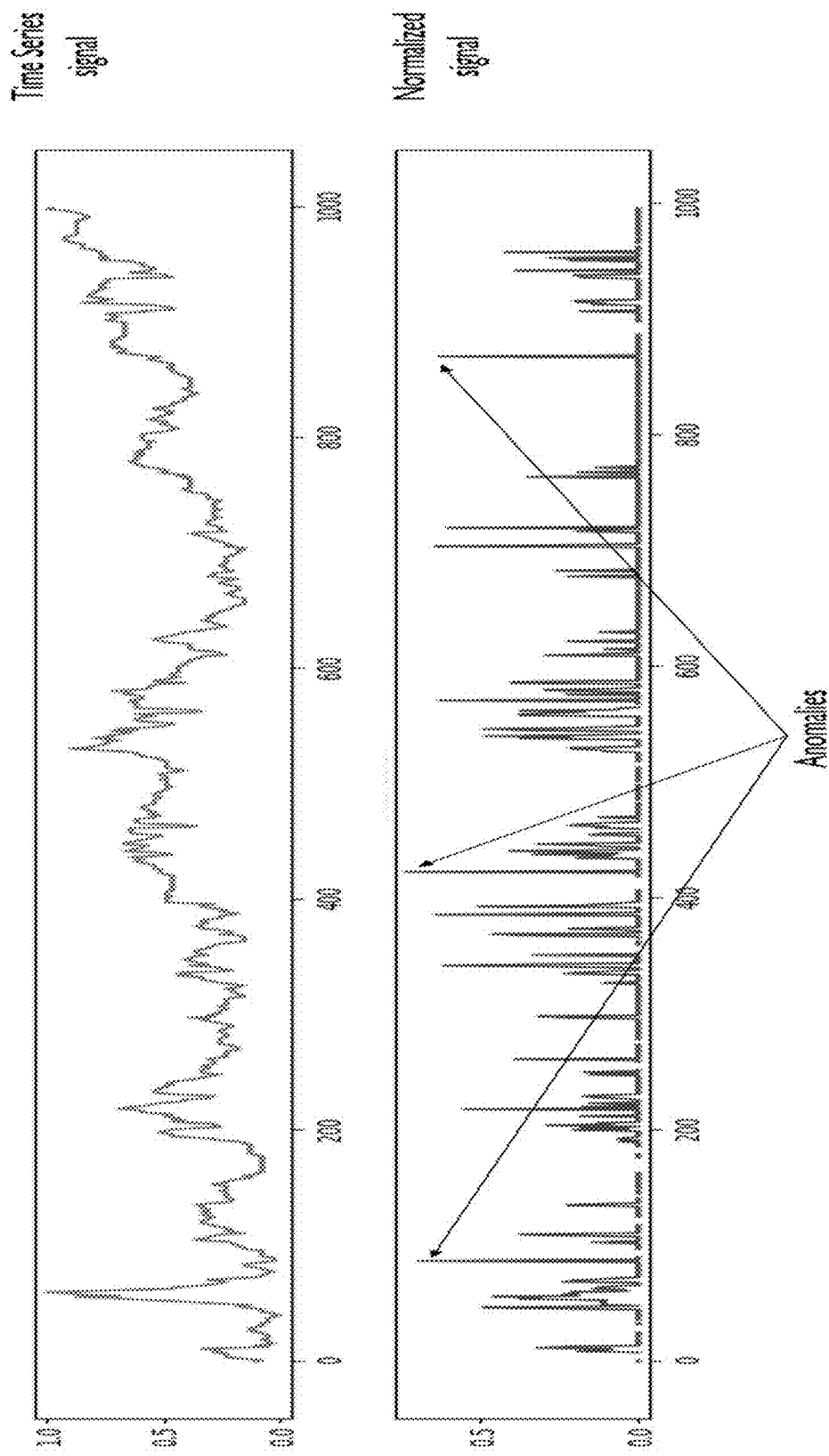
FIG. 5 is a simplified diagram of a plot illustrating a time series process according to an example of the present invention.

FIG. 5 is a simplified diagram of a plot illustrating a time series process showing anomaly vs normalized signal according to an example of the present invention.

Figure 6:
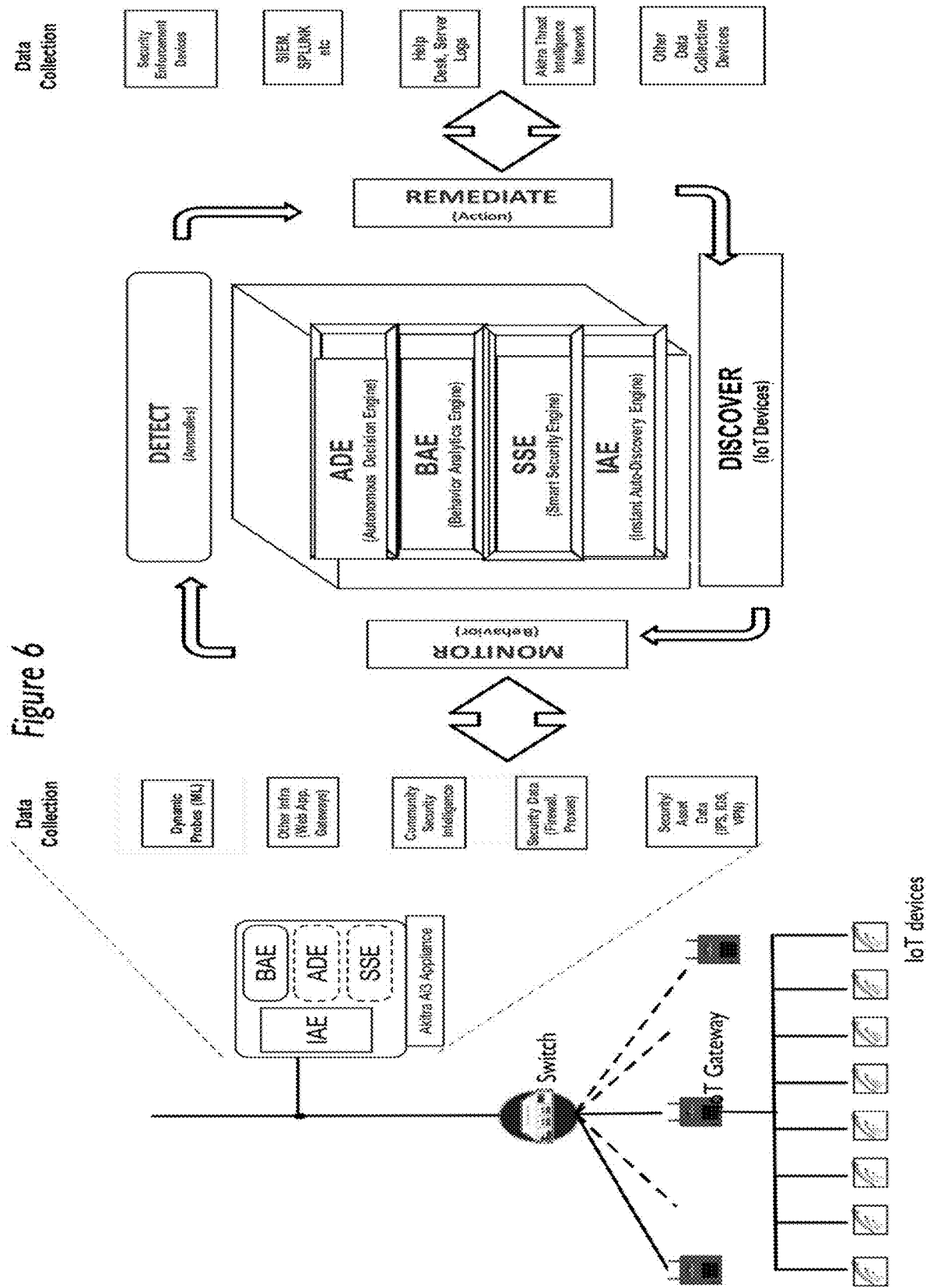
FIG. 6 is a simplified diagram illustrating a network configured with an artificial intelligence system according to an example of the present invention.

FIG. 6 is a more abstract rendition illustrating a network configured with an artificial intelligence system according to an example of the present invention. In an example, the network has a switch (or other probe or other network monitoring entity or tap (i.e., test access point device) or other location). The switch is coupled to an Internet of Things ("IoT") gateway. Each gateway is coupled to a plurality of IoT devices. In an example, the IoT gateway can be configured as a single device in a switch, which has converged with the gateway. In an example, the IoT device can be configured directly to the Internet or cloud.

It shows the four key components of the of the invention and the approach to "discover", "monitor, "detect" and "remediate" over the course of its continuous operation. It also shows a range of different data sources which the system consumes continuously as a means to make intelligent network traffic decisions in real time.

In an example, the system has an autonomous decision engine ("ADE"). The ADE has been described herein, and further below. The system has a behavior analytics engine ("BAE"), which is also explained further below. Similarly, the system has smart security engine ("SSE") and instant auto discovery engine ("IAE"). Each of the engines configured together, as shown. In an example, the method includes a step of discover, monitor, detect, and remediate, which is repeated as shown. The engines are coupled to a plurality of data collection processes from existing networking devices, infrastructure, and other entities.

In an example, the system is an enterprise network system. The system has various elements such as a data source coupled to a network, a router coupled to the data source, a switch device coupled to the router, among other network elements. The network can include servers such as web servers, database servers, and other application servers, bridges, other routers and switches, connected to a data center or Cloud.

In an example, the present system has an engine configured with a plurality of specialized engines. The engine has an instant auto discovery engine (TAB) module coupled to switch device. In an example, the discovery module is configured to monitor traffic to the switch device to detect all of a plurality of client devices, including a plurality of IoT devices. The IAE module is coupled to the switch device and configured to detect all of a plurality of sensor devices coupled to the switch device. The IAE module is configured to detect all of a plurality input device coupled to the switch device. The IAE module comprises a catalog of each of the plurality of client devices, input devices, sensing devices, or other network devices. Each of the devices also has profile information on a common database or memory resources.

Additionally, the engine has a behavior analytics engine (BAE) module coupled to the switch device. The BAE module is configured to monitor traffic to the switch device and configured to detect one or more anomalies from a flow of traffic. Of course, there can be other variations, modifications, and alternatives.

The engine has an intelligent machine learning engine (IMLE) module configured with the BAE module. In an example, the IMLE module is configured to process the flow of data through one of a plurality of processes. The one of the plurality of processes is numbered from one through N, where N is greater than 5 or other number greater than 1. In an example, the plurality of processes is categorized into a clustering process, a classification process, a regression process, an association process, a probabilistic processes comprise a Bayesian Network, or a graph based model, alone or in combination with any of the other aforementioned processes, among others.

In an example, the engine has a smart security engine (SSE) module. In an example, the SSE module is configured to implement a security measure from feedback from the BAE module.

The engine has an autonomous decision engine (ADE) module coupled to the SSE module. In an example, the ADE module is configured for a remediation process. In an example, the remediation process comprises an autonomous decision engine comprising a sense process, plan process, and an act process (collectively the "AI processes" or "AI decision processes"), and is configured to make a decision from the flow of data to remediate and take appropriate action based upon the what signal is received from the client device, and processed through a behavior analytics engine thereby feeding information into the autonomous decision engine taking into account information selected form an a status of an internal state, a response associated with the internal state and a received input, and a model associated with the device from a catalog stored in a database for remediation to reason over achieving a future state using remediation to predict a future state and use the AI processes to ensure migration to the future state.

In an example, the engine works with the modules to collectively perform the operations described, among other operations. In an example, the IAE module, BAE module, ADE module, and SSE module are configured to discover instantly the plurality of client devices connected to the network, monitoring the flow of data from each of the plurality of the client devices, detecting at least one anomaly, and taking a remediation action for the detected anomaly.

In an example, the IAE module comprises the catalog in a database, the database comprising a profile information for each of the plurality of client devices. In an example, the remediation process occurs without use of any rule based processes explicitly coded and the remediation occurs consisting of AI processes that form a template for the client device to operate. In an example, the remediation process is a parallel activity tracking all client devices from the flow of data simultaneously by monitoring each client device's state, incoming data signal, and a consulting the AI processes to decide what action is taken for the client device. In an example, the remediation process is for an output of one of the client devices leading to that output influencing a state of another client device or leading to an output of a security measure to secure the network such that one or more of the client devices or network or network portion is isolated, shut down, or off lining the one or more devices or, alternatively, the security measure places the one or more client devices, network, or network portion in an observation mode for a predetermined time to ensure that the one or more client devices, network, or network portion has not been compromised to ensure that the anomaly is not a false positive and is a real anomaly and real threat to the network. Of course, there can be other variations, modifications, and alternatives.

In an example, the system has a user-interface or dashboard to display the flow of traffic through network of devices in real time and display any off-normal patterns or behaviors. In an example, the user interface or the dashboard is configured as a web based interface, an application for a mobile device, or an interface for a tablet or portable or non-portable computer. In an example, the user interface displaying a spatial topography of the plurality of devices, including a plurality of IoT devices, connected to network, one or more compromised devices, and associated connections whether an originating connection or destination connection.

In an example, the system provides an alternative enterprise network system. The system has a data source coupled to a network, a router coupled to the data source, a switch device coupled to the router, and a discovery module coupled to switch device.

In an example, the discovery module is configured to monitor traffic to the switch device to detect all of a plurality of client devices coupled to the switch device, detect all of a plurality of sensor devices coupled to the switch device, and detect all of a plurality input device coupled to the switch device. In an example, the discovery module comprises a catalog of each of the plurality of client devices, input devices, sensing devices, or other network devices. In an example, the system has a monitoring module coupled to the switch device. In an example, the monitoring module is configured to monitor traffic to the switch device.

In an example, the system has an AI based monitoring and detection module coupled to the switch device. In an example, the AI based monitoring and detection module is configured to detect one or more anomalies from a flow of data from each of the plurality of client devices through the switch device. In an example, the detection module is configured to process the flow of information through one of a plurality of processes, one of the plurality of processes numbered from one through N, where N is greater than 5 or less than 5 but greater than one. In an example, the plurality of processes is categorized into a clustering process, a classification process, a regression process, an association process, probabilistic processes comprise a Bayesian Network, or a graph based model, alone or in combination with any of the other aforementioned processes, or others. In an example, the system has a remediation module coupled to the switch device. In an example, the remediation module is configured to initiate a remediation process based upon the detection of at least one of the anomalies from the flow of data.

In an example, AI based monitoring and detection module is configured to detect a normal behavior of one of the client devices such that the AI based monitoring and detection module is configured to model and profile a baseline behavior expected from one of the client devices coupled to the network. In an example, the client device can be a client or an IoT device.

In an example, the traffic can be selected from information on the traffic, a characteristic of one of the client devices, or any IoT devices coupled to the network.

In an example, the system has an intelligent machine learning engine configured to dynamically select one or more than one of the processes from the AI based monitoring and detection module that is desirable to identify and process the anomaly. In an example, the clustering process and the classification process are configured to be a predictive process. In an example, the regression process, and the association process are configured to be a descriptive process. In an example, the flow of data has a speed of 10 Giga bits per second (Gbps) and 100 Gbps, and higher.

In an example, the plurality of client devices comprises a computer, a laptop, a smart phone, Internet of Things (IoT) devices such as IP Cameras, smart watches, smart thermostats, smart locks, smart refrigerators, smart bulbs, smart switches, Internet of Medical Things (IoMT) devices such as X-Ray Machines, Infusion Pumps, and other devices connected to the network in a healthcare organization or hospital systems or a tablet computer or any kind of mobile computer. In an example, the network devices comprise a router, the switch, a wireless transceiver, a bridge, or an interface or a connected device.

In an example, the flow of data from one or more of the client devices, the one or more client devices is selected from a thermostat, a bulb, a camera, a printer, a smart lock, a smart refrigerator, a smart specific purpose devices that connect to the network or any other kind of IoT device.

In an example, the system has a behavior analytics engine comprises an intelligent machine learning processes engine consisting of number of processes that process the flow of data to determine an anomalous behavior while removing a false positive to ensure the anomaly is a genuine anomaly.

Figure 7:
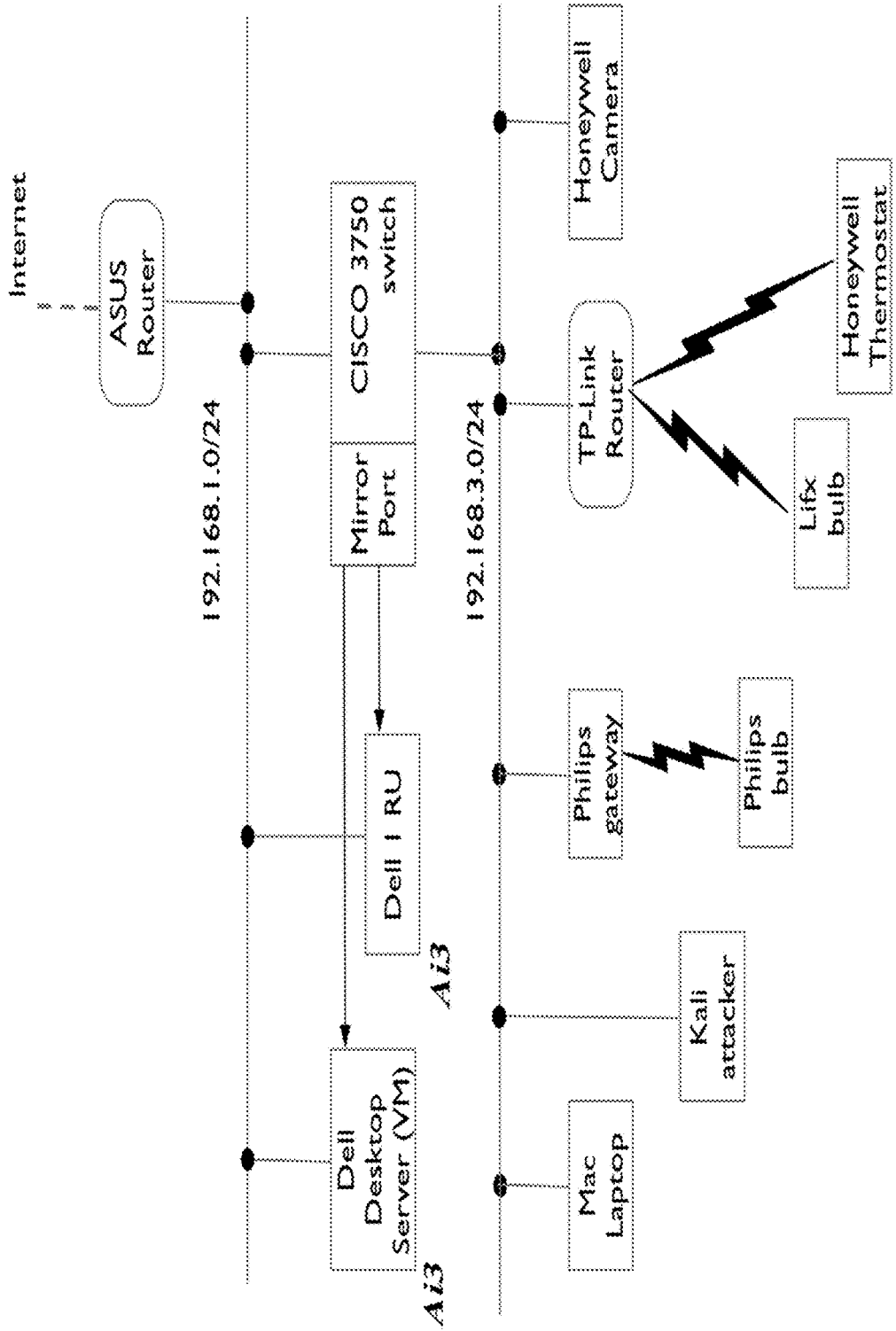
FIG. 7 is a more detailed diagram illustrating a network configured with an artificial intelligence system according to an example of the present invention.

FIG. 7 is a simplified diagram illustrating a network configured with an artificial intelligence system in a simulated laboratory setting as an example of the present invention. It shows a number of IoT devices connected to a router in an enterprise setting with traffic flow passing through a switch with a mirror port. The latter reflects all traffic that is then directed to an appliance(s) based on the present invention, whether it be a virtual machine (VM) or deployed on actual hardware. In this laboratory setting, the figure shows an attacker VM which is used to simulate a broad range of possible attacks which can be crafted to show the resilience of the artificial intelligence system.

FIG. 8 is a catalog table according to an example of the present invention. As in FIG. 2, it shows the detail associated with each device that it is commercially available for enterprise use. Instantiation of specific devices on the network matching catalog entries then provide the system in the present invention with actionable intelligence for its operation.

In an example, various hardware elements of the invention can be implemented using a "pizza box" computer also called a rack or tower server or using a smart phone according to an embodiment of the present invention.

Additionally, these devices or micro devices such as smart phones includes a housing, display, and interface device, which may include a button, microphone, or touch screen. Preferably, the phone has a high-resolution camera device, which can be used in various modes. An example of a smart phone can be an iPhone from Apple Computer of Cupertino Calif. Alternatively, the smart phone can be a Galaxy from Samsung or others.

In an example, the smart phone includes the following features (which are found in an iPhone from Apple Computer, although there can be variations), see www.apple.com, which is incorporated by reference. In an example, the phone can include 802.11b/g/n Wi-Fi (802.11 n 2.4 GHz only), Bluetooth 2.1+EDR wireless technology, Assisted GPS, Digital compass, Wi-Fi, Cellular, Retina display, 5-megapixel iSight camera, Video recording, HD (720p) up to 30 frames per second with audio, Photo and video geotagging, Three-axis gyro, Accelerometer, Proximity sensor, and Ambient light sensor. Of course, there can be other variations, modifications, and alternatives.

An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the mobile device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in one embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

In an embodiment, one or more of the user input structures are configured to control the device, such as by controlling a mode of operation, an output level, an output type, etc. For instance, the user input structures may include a button to turn the device on or off. Further the user input structures may allow a user to interact with the user interface on the display. Embodiments of the portable electronic device may include any number of user input structures, including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

The exemplary device may also include various input and output ports to allow connection of additional devices. For example, a port may be a headphone jack that provides for the connection of headphones. Additionally, a port may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device may use the input and output ports to connect to and send or receive data with any other device, such as other portable electronic devices, personal computers, printers, or the like. For example, in one embodiment, the device may connect to a personal computer via an IEEE-1394 connection to send and receive data files, such as media files. Further details of the device can be found in U.S. Pat. No. 8,294,730, assigned to Apple, Inc.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

Further information regarding Intrusion Detection Systems can be found in the following references:

Gartner: Defining Intrusion Detection and Prevention Systems". Retrieved Sep. 20, 2016. Scarfone, Karen; Mell, Peter (February 2007). "Guide to Intrusion Detection and Prevention Systems (IDPS)" (PDF). Computer Security Resource Center. National Institute of Standards and Technology (800-94). Retrieved 1 Jan. 2010

Engin Kirda; Somesh Jha; Davide Balzarotti (2009). Recent Advances in Intrusion Detection: 12th International Symposium, RAID 2009, Saint-Malo, France, Sep. 23-25, 2009, Proceedings. Springer. p. 162. ISBN 978-3-642-04341-3. Retrieved 29 Jun. 2010

Intrusion Detection Systems (Advances in Information Security) 2008th Edition, by Roberto Di Pietro (Editor), Luigi V. Mancini Snort Primer: A FAQ Based Introduction To The Most Popular Open-Source IDS/IPS Program, Nov. 27, 2015, by Ashley Thomas The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An enterprise network system comprising:
    a data source coupled to a network;
    a router coupled to the data source;
    a switch device coupled to the router;
    a discovery module coupled to the switch device, the discovery module configured to monitor traffic to the switch device to detect all of a plurality of client devices coupled to the switch device, detect all of a plurality of sensor devices coupled to the switch device, and detect all of a plurality input device coupled to the switch device, the discovery module comprising a catalog of each of the plurality of client devices, the input devices, the sensing devices, or other network devices;
    a monitoring module coupled to the switch device, the monitoring module configured to monitor traffic to the switch device;
    an AI based monitoring and detection module coupled to the switch device, the AI based monitoring and detection module configured through the switch device to detect one or more anomalies from a flow of data from each of the plurality of client devices and the AI based monitoring and detection module configured through the switch device to process the flow of data through a process selected out of a plurality of processes, the plurality of processes being numbered individually from one through N, where N is greater than 5, the plurality of processes include a clustering process, a classification process, a regression process, an association process, a plurality of probabilistic processes comprising a Bayesian Network, or a graph based model, alone or in combination with any of the other aforementioned processes; and
    a remediation module coupled to the switch device, the remediation module configured to initiate a remediation process based upon the detection of at least one of the anomalies from the flow of data.

2. The system of claim 1 wherein AI based monitoring and detection module is configured to detect a normal behavior of one of the client devices such that the AI based
monitoring and detection module is configured to model and profile a baseline behavior expected from one of the client devices coupled to the network, the client device can be a client or an IoT device.

3. The system claim 1 wherein the traffic can be selected from information on the traffic, a characteristic of one of the client devices, or any IoT devices coupled to the network.

4. The system claim 1 further comprising an intelligent machine learning engine configured to dynamically select one or more than one of the processes from the plurality of processes that is desirable to identify and process the anomaly.

5. The system of claim 1 wherein the clustering process and the classification process are configured to be a predictive process.

6. The system of claim 1 wherein the regression process, and the association process are configured to be a descriptive process.

7. The system of claim 1 wherein the flow of data has a speed.

8. The system of claim 1 wherein the plurality of client devices comprises a computer, a laptop, a smart phone, Internet of Things (IoT) devices such as IP Cameras, smart watches, smart thermostats, smart locks, smart refrigerators, smart bulbs, smart switches, Internet of Medical Things (IoMT) devices such as X-Ray Machines, Infusion Pumps, and other devices connected to the network in a healthcare organization or hospital systems or a tablet computer or any kind of mobile computer.

9. The system of claim 1 wherein the network devices comprise a router, the switch, a wireless transceiver, a bridge, or an interface or a connected device.

10. The system of claim 1 wherein the one or more client devices is selected from a thermostat, a bulb, a camera, a printer, a smart lock, a smart refrigerator, a smart specific purpose devices that connect to the network or any other kind of IoT device.

11. The system of claim 1 further comprising a behavior analytics engine comprises an intelligent machine learning processes engine consisting of number of processes that process the flow of data to determine an anomalous behavior while removing a false positive to ensure the anomaly is a genuine anomaly.

12. The system of claim 11 wherein the remediation module comprising an autonomous decision engine comprising a sense process, plan process, and an act process (collectively the "AI processes"), and the autonomous decision engine being configured to make a decision from the flow of data to remediate and take appropriate action based upon a signal received from the client device, and processed through a behavior analytics engine thereby feeding information into the autonomous decision engine taking into account information selected form an a status of an internal state, a response associated with the internal state and a received input, and a model associated with the device from a catalog stored in a database for remediation to reason over achieving a future state using remediation to predict a future state and use the AI processes to ensure migration to the future state.

13. The system of claim 12 wherein the remediation occurs without use of any rule based processes explicitly coded and the remediation occurs consisting of AI processes that forms a template for the client device to operate.

14. The system of claim 13 wherein the remediation is a parallel activity tracking all client devices from the flow of data simultaneously by monitoring each client device's state, incoming data signal, and a consulting the AI processes to decide what action is taken for the client device.

15. The system of claim 14 wherein the remediation for an output of one of the client devices leading to that output influencing a state of another client device or leading to an output of a security measure to secure the network such that one or more of the client devices or network or network portion is isolated, shut down, or off lining the one or more devices or, alternatively, the security measure places the one or more client devices, network, or network portion in an observation mode for a predetermined time to ensure that the one or more client devices, network, or network portion has not been compromised to ensure that the anomaly is not a false positive and is a real anomaly and real threat to the network.

16. The system of claim 1 further comprising a user-interface or dashboard to display the flow of traffic through network of devices in real time and display any off-normal patterns or behaviors, the user interface or the dashboard being configured as a web-based interface, an application for a mobile device, or an interface for a tablet or portable or non-portable computer.

17. The system of claim 1 further comprising a user interface displaying a spatial topography of the plurality of devices, including a plurality of IoT devices, connected to network, one or more compromised devices, and associated connections whether an originating connection or destination connection.

* * * * *